United States Patent
Ogasawara

(10) Patent No.: US 10,192,524 B2
(45) Date of Patent: Jan. 29, 2019

(54) IMAGE DISPLAY APPARATUS, IMAGE DISPLAY METHOD, AND STORAGE MEDIUM

(71) Applicant: CANON KABUSHIKI KAISHA, Tokyo (JP)

(72) Inventor: Taku Ogasawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 15/229,570

(22) Filed: Aug. 5, 2016

(65) Prior Publication Data

US 2017/0047043 A1 Feb. 16, 2017

(30) Foreign Application Priority Data

Aug. 10, 2015 (JP) .................. 2015-157983

(51) Int. Cl.
*G09G 5/26* (2006.01)
*G09G 5/14* (2006.01)

(52) U.S. Cl.
CPC ................. *G09G 5/26* (2013.01); *G09G 5/14* (2013.01); *G06F 2203/04806* (2013.01); *G09G 2320/0261* (2013.01); *G09G 2340/04* (2013.01); *G09G 2340/045* (2013.01); *G09G 2340/14* (2013.01); *G09G 2340/145* (2013.01); *G09G 2370/042* (2013.01)

(58) Field of Classification Search
CPC .... G06F 3/0482; G06F 3/04842; G06F 3/013; G06F 2203/04806
See application file for complete search history.

(56) References Cited

U.S. PATENT DOCUMENTS

| | | | | |
|---|---|---|---|---|
| 2003/0234799 A1* | 12/2003 | Lee | ..................... | G06F 3/1407 345/660 |
| 2009/0009535 A1* | 1/2009 | Iwamoto | .............. | G01C 21/367 345/666 |
| 2010/0029255 A1* | 2/2010 | Kim | ..................... | G06F 1/1626 455/414.2 |
| 2010/0238041 A1* | 9/2010 | Acedo | ..................... | G06T 3/40 340/686.6 |
| 2011/0035702 A1* | 2/2011 | Williams | ............. | G06F 3/0481 715/800 |
| 2011/0050707 A1* | 3/2011 | Kim | ..................... | A63B 22/00 345/467 |
| 2012/0124525 A1* | 5/2012 | Kang | ..................... | G06F 3/011 715/863 |
| 2013/0106888 A1* | 5/2013 | Penner | .................. | G06F 3/0484 345/582 |
| 2013/0176344 A1* | 7/2013 | Mandic | ............... | G06F 3/04883 345/661 |

(Continued)

FOREIGN PATENT DOCUMENTS

JP    2012-022589 A    2/2012

*Primary Examiner* — Jeffrey Chow
(74) *Attorney, Agent, or Firm* — Cowan, Liebowitz & Latman, P.C.

(57) ABSTRACT

An image display apparatus enlarges a display target object to be displayed among a plurality of objects included in an image and displays the enlarged display target object on a screen one by one in order. In addition, the image display apparatus detects whether there is a person in a predetermined range from the image display apparatus and decides a next display target object to be displayed on the screen based on a result of the detection.

12 Claims, 13 Drawing Sheets

(56) References Cited

U.S. PATENT DOCUMENTS

| | | | |
|---|---|---|---|
| 2013/0176345 A1* | 7/2013 | Kim | G06T 3/40 345/666 |
| 2013/0321312 A1* | 12/2013 | Higashi | G06F 3/041 345/173 |
| 2014/0240362 A1* | 8/2014 | Kurita | G09G 5/373 345/661 |
| 2014/0344736 A1* | 11/2014 | Ryman | G06F 3/04883 715/767 |
| 2015/0009238 A1* | 1/2015 | Kudalkar | G09G 3/20 345/661 |
| 2016/0170617 A1* | 6/2016 | Shi | G06F 3/0484 345/668 |
| 2017/0060319 A1* | 3/2017 | Seo | G06F 3/0416 |
| 2018/0031842 A1* | 2/2018 | Tsai | G02B 27/0172 |

\* cited by examiner

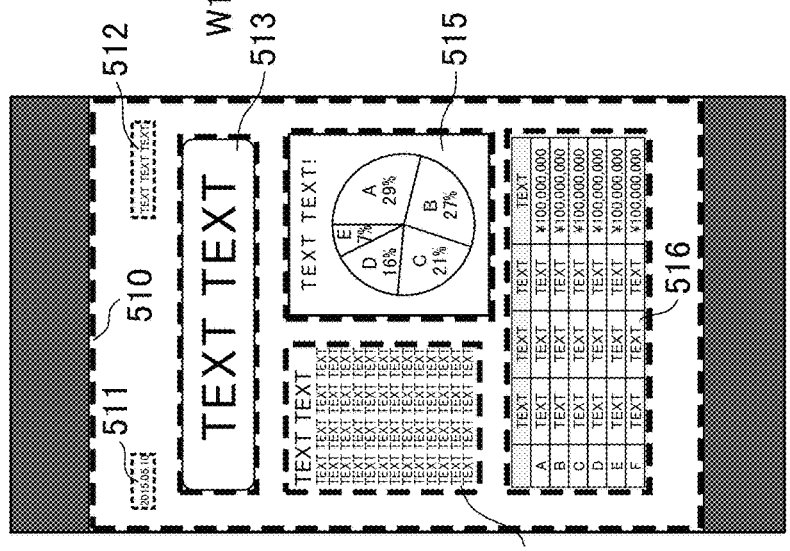
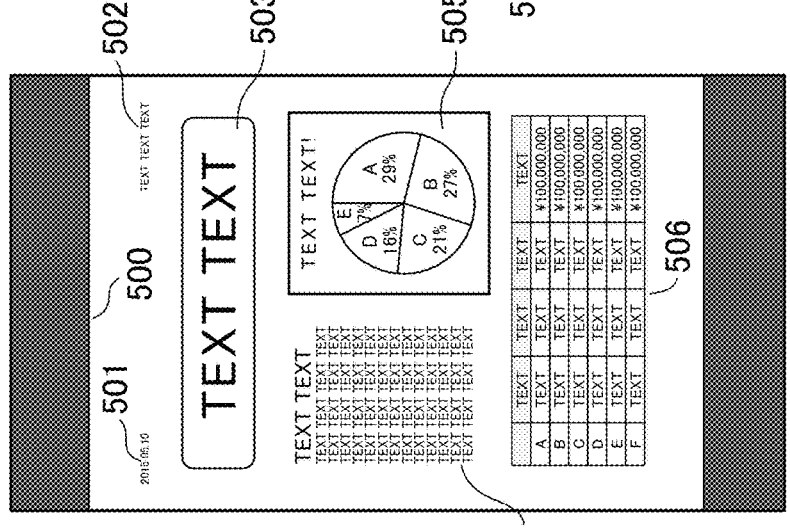

FIG. 6

| Page number 601 | Partial region number 602 | Coordinate (x, y) 603 | Width and height (w, h) 604 | Region attribute 605 | Text orientation 606 | Text size 607 | Display order 608 | Display magnification rate 611 | Display time 612 | Display/ Non-display 613 | Display type 614 |
|---|---|---|---|---|---|---|---|---|---|---|---|
| 1 | 1 | (X10,Y10) | (W10,H10) | Background | – | – | 1 | M10 | T10 | Display | Detail |
| 1 | 2 | (X11,Y11) | (W11,H11) | Header | Horizontal | S12 | 2 | M11 | T11 | Display | No |
| 1 | 3 | (X12,Y12) | (W12,H12) | Header | Horizontal | S13 | 3 | M12 | T12 | Display | No |
| 1 | 4 | (X13,Y13) | (W13,H13) | Title | Horizontal | S14 | 4 | M13 | T13 | Display | Overview |
| 1 | 5 | (X14,Y14) | (W14,H14) | Text | Horizontal | S15 | 5 | M14 | T14 | Display | Detail |
| 1 | 6 | (X15,Y15) | (W15,H15) | Drawing | – | – | 6 | M15 | T16 | Display | Overview |
| 1 | 7 | (X15,Y15) | (W15,H15) | Drawing | – | – | 7 | M16 | T16 | Display | Detail |
| 2 | 1 | (X21,Y21) | (W21,H21) | Background | – | – | 1 | M20 | T20 | Display | Detail |
| ... | ... | ... | ... | ... | ... | ... | ... | ... | ... | ... | ... |

IMAGE DISPLAY APPARATUS, IMAGE DISPLAY METHOD, AND STORAGE MEDIUM

BACKGROUND OF THE INVENTION

Field of the Invention

The present invention relates to an image display apparatus, an image display method, and a storage medium.

Description of the Related Art

In digital signage, page images are generally reproduced automatically. For example, in sales shops of banks, insurance companies and the like, installing digital signage in the shop to repeatedly release information is considered. The information displayed includes, for example, explanatory materials and the like of financial products sold by the banks and insurance companies.

Such explanatory materials are not only displayed in digital signage, but also printed to be used as paper materials which customers bring back from the sales shops of the banks, insurance companies and the like. In this case, if the materials are created both for displaying in digital signage and for printing on paper, an extra cost is incurred. For this reason, the demand for using materials created for printing on paper as for displaying in digital signage without change.

Japanese Patent Laid-Open No. 2012-22589 discloses a method of changing a display form according to a distance between a display screen and a user and a degree of observation based on a gaze direction of the user and the like.

However, Japanese Patent Laid-Open No. 2012-22589 does not disclose that content (page images) created for printing on paper is used for display in digital signage. Since the content created for printing on paper is configured to display page images in order by page number, if the content is used for display in digital signage without change, it is difficult to perform display by automatically selecting and switching display content according to whether a person approaches a display screen. For this reason, like a slide show in an application for a presentation, it is only possible to simply display entire page images included in content in order.

In addition, document component such as a header, a title, or diagrams are laid out in page images created for printing on paper so that they are easy to read on A4 or A3 size paper. For this reason, in display of digital signage, when only entire page images are displayed, individual components of the page images appear small to a person who does not approach the display screen and content is not easy to understand in some cases. In addition, when only entire page images are displayed, it is not possible to easily display which part of the page image needs to be focused on to understand the content well.

SUMMARY OF THE INVENTION

The present invention provides an image display apparatus which can perform display by automatically selecting and switching content displayed on the image display apparatus according to whether there is a person near the image display apparatus.

According to an aspect of the present invention, an image display apparatus includes a display control unit configured to enlarge a display target object to be displayed among a plurality of objects included in an image and to display the enlarged display target object on a screen one by one in order, a detection unit configured to detect whether there is a person in a predetermined range from the image display apparatus, and a decision unit configured to decide a next display target object to be displayed on the screen by the display control unit based on a result detected by the detection unit.

According to the image display apparatus, it is possible to perform display by automatically selecting and switching content to be displayed on the image display apparatus according to whether there is a person near the image display apparatus. Accordingly, even if content created for printing on paper is displayed on digital signage, it is possible to automatically select and display optimum display content according to whether there is a person near the image display apparatus.

Further features of the present invention will become apparent from the following description of exemplary embodiments (with reference to the attached drawings).

BRIEF DESCRIPTION OF THE DRAWINGS

FIGS. 5A to 5C are diagrams each showing an example of a result of the structural analysis processing of the page image.

FIG. 6 is a diagram showing partial region data and a partial region management table.

DESCRIPTION OF THE EMBODIMENTS

Hereinafter, embodiments of the present invention will be described with reference to the drawings.

First Embodiment (Hardware Configuration of an Image Display Apparatus)

Figure 1A:
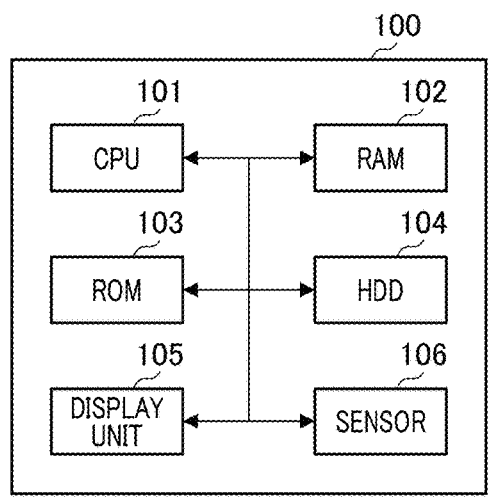
FIGS. 1A to 1C are diagrams showing a hardware configuration example, a display unit, and a sensor detection range of an image display apparatus.

FIG. 1A is a diagram showing a hardware configuration example of an image display apparatus.

An image display apparatus 100 includes a CPU 101, a RAM 102, a ROM 103, an HDD 104, a display unit 105, and a sensor 106.

The CPU 101 executes an image processing program stored in the ROM 103, and displays a page image on the display unit 105 of the image display apparatus 100. The RAM 102 is a memory that is assigned to an image processing program executed by the CPU 101. The HDD 104 is a storage device used to read and write data in the image processing program executed by the CPU 101. Data processed by the image processing program is a plurality of page images included in content. The content and the page images will be described below using FIG. 2.

Figure 1B:
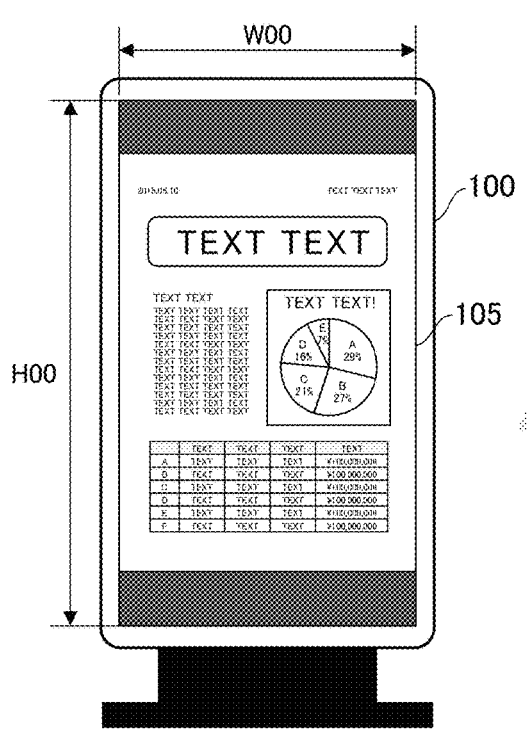
Figure 1C:
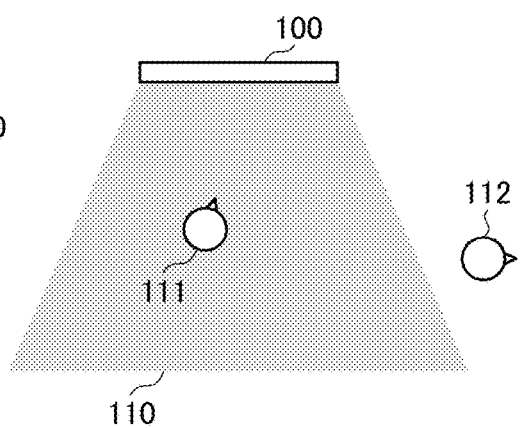

The display unit 105 is a screen displaying page images. FIG. 1B is a view showing the display unit 105. As shown in FIG. 1B, a size of the display unit 105 has a width of W00 and a height of H00. The sensor 106 is an infrared sensor, and detects whether there is an object in front of the image display apparatus 100. FIG. 1C is a view showing a detection range of the sensor 106. As shown in FIG. 1C, the sensor 106 has a detection range 110 in front of the image display apparatus 100. The sensor 106 mainly determines whether there is a person in the detection range 110.

In FIG. 1C, for example, if there is a person in the detection range 110 like a person 111, it is determined that there is a person in front of the image display apparatus 100. In addition, if there is not a person in the detection range 110 like a person 112, it is determined that there is no person in front of the image display apparatus 100. The image display apparatus 100 switches content of the page images displayed on the display unit 105 according to whether not a person is detected.

(Content and Page Images)

Figure 2:
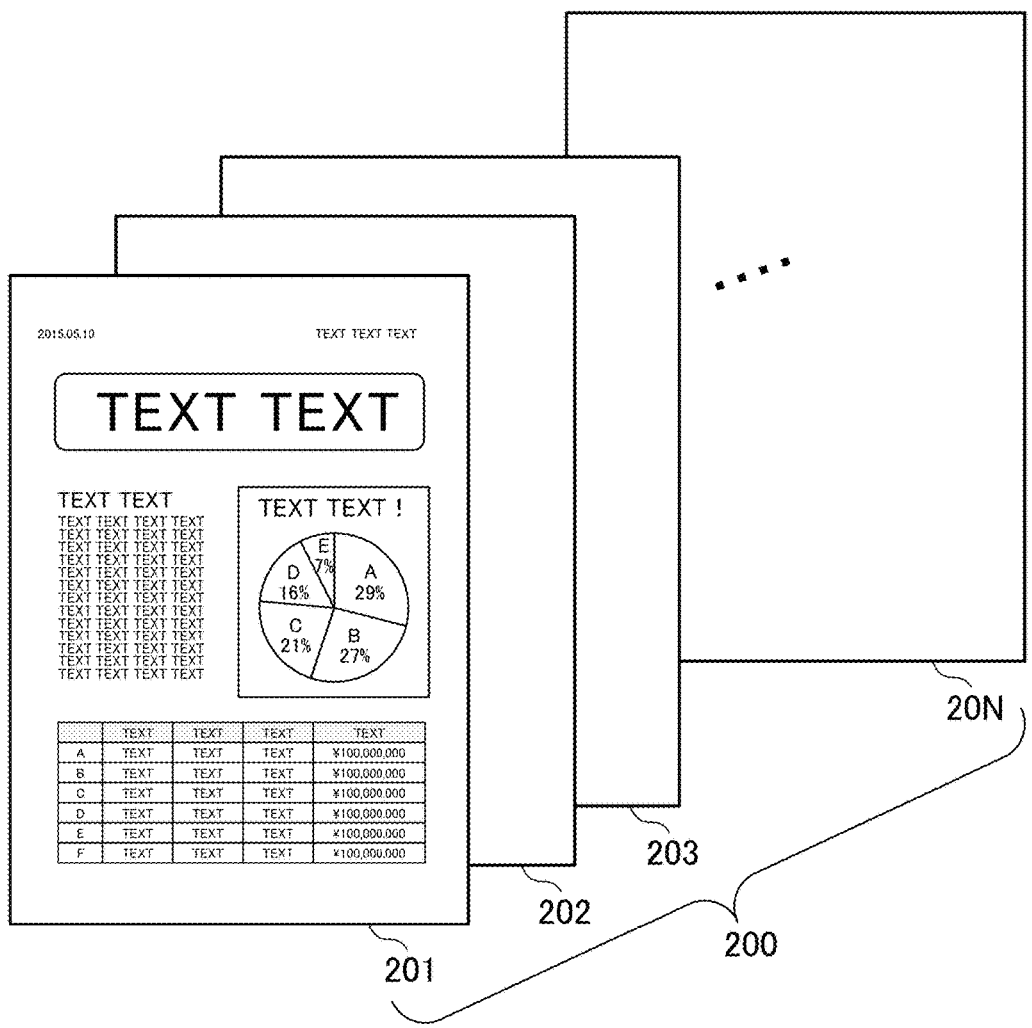
FIG. 2 is a diagram showing content and page images processed by the image display apparatus.

FIG. 2 is a diagram showing content and page images processed by the image display apparatus.

The content 200 is configured of a plurality of page images 201 to 20N. The number of pages of the content is set to N. The content 200 corresponds to a document file handled by a general information processing apparatus, and the page images 201 to 20N correspond to page data included in the document file.

In the embodiment, a format of the page images is a raster image, for example, a JPEG or TIFF file. The image display apparatus 100 executes an image processing program with respect to all of the page images 201 to 20N included in one piece of content 200.

(A Processing Block of the Image Display Apparatus)

Figure 3:
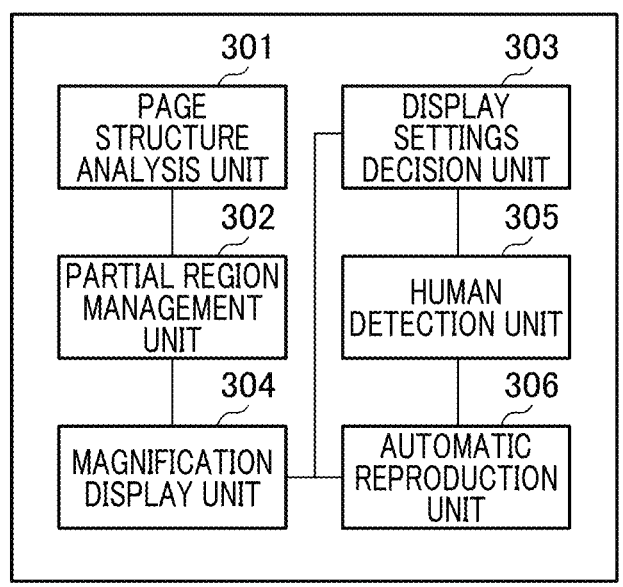
FIG. 3 is a diagram showing a processing block of the image display apparatus.

FIG. 3A is a diagram showing a processing block for realizing the image processing program of the image display apparatus in the embodiment.

The processing block for realizing the image processing program is configured of a page structure analysis unit 301, a partial region management unit 302, a display settings decision unit 303, a magnification display unit 304, a human detection unit 305, and an automatic reproduction unit 306.

The image display apparatus 100 executes an image processing program included in the ROM 103 using the CPU 101 and realizes each processing block described above. The role of each block will be described below.

The page structure analysis unit 301 executes structural analysis processing of a page image. The structural analysis processing is processing of automatically recognizing a plurality of partial regions (objects) in the page image according to document components such as text or diagrams included in the page image.

The document components are individual elements configuring a document such as a header, a footer, a title, text, a diagram, an image, or a background in the document. The document components and the structural analysis processing of a page image will be described below using FIG. 4. Information on partial regions (objects) obtained after the structural analysis processing of a page image is executed is referred to as partial region data. The partial region data is data of a partial region such as coordinates or widths and heights (hereinafter referred to as widths and heights) of the partial regions in the page image. The partial region data further includes information such as attributes (display settings) on display by the display settings decision unit 303 to be described later. The details of the partial region data will be described below using FIGS. 5 and 6.

The partial region management unit 302 manages partial region data and a partial region management table. The partial region management table is a table for managing a plurality of pieces of partial region data. The partial region management table will be described below using FIG. 6. The display settings decision unit 303 uses partial region data managed by the partial region management unit 302 and executes processing for deciding display settings (attributes for display) of each partial region. A result of the processing for deciding display settings is added to the partial region data. The processing for deciding display settings will be described below using FIGS. 7 to 9.

The magnification display unit 304 executes magnification display processing of partial regions to display the partial regions in the page image on the display unit 105 at a display magnification rate of each partial region in the page image. Information such as the coordinates or the display magnification rates of the partial regions which are required for display is specified as the partial region data. The magnification display processing of the partial regions will be described below using FIG. 12. The human detection unit 305 determines whether there is a person in front of the image display apparatus 100 using the sensor 106, and then notifies the automatic reproduction unit 306 of a result of the determination.

The automatic reproduction unit 306 displays (auto-plays) the partial regions in order using the partial region data and the display unit 105. In addition, the automatic reproduction unit 306 displays the partial regions by switching a partial region to be displayed according to the notification from the human detection unit 305. The automatic reproduction processing will be described below using FIG. 10. Moreover, screen transition of the display unit 105 when automatic reproduction processing is executed will be described below using FIGS. 13A to 13E.

(Structural Analysis Processing)

Figure 4:
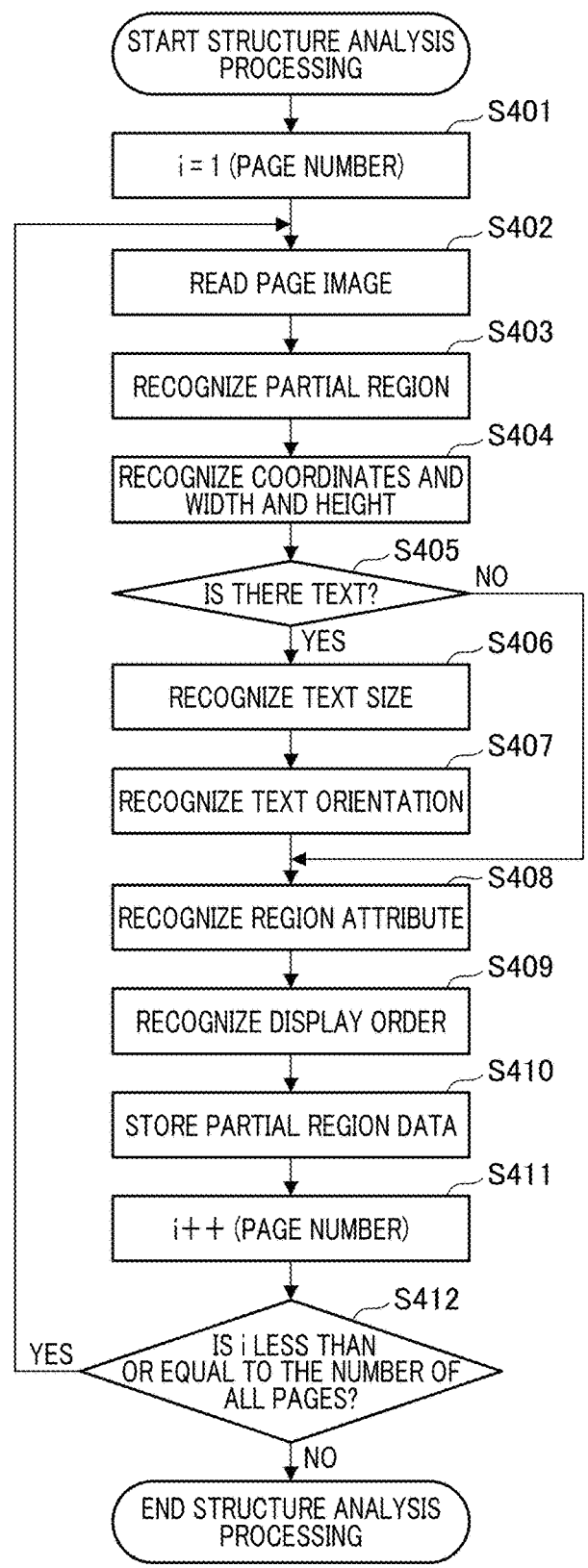
FIG. 4 is a flowchart describing structural analysis processing of a page image.

FIG. 4 is a flowchart describing structural analysis processing of the page image, which is executed by the page structure analysis unit 301.

The structural analysis processing of the page image is processing of automatically recognizing the plurality of partial regions (objects) of the page image according to document components of the page image. The document components are individual elements configuring a document such as a header, a footer, a title, text, a diagram, an image, or a background in the document.

The structural analysis processing of the page image is executed in order with respect to all pages of the content 200. That is, the page structure analysis unit 301 starts processing from a first page at a beginning and executes the processing for a next page after the processing for the first page is completed. This is repeated until a last page. Here, the structural analysis processing of the page image will be described using an example of the page image of FIGS. 5A to 5C. The page image of FIGS. 5A to 5C is a page image 201 which is a first page in the content 200 of FIG. 2.

In step S401, the page structure analysis unit 301 sets a page number to be processed to a variable i. The variable i is an index of an increment for executing the processing for all pages. Initially, 1 of a first page number is set as the variable i.

In step S402, the page structure analysis unit 301 reads a page image of an i$^{th}$ page of the content 200 stored in the HDD 104 of the image display apparatus 100.

In step S403, the page structure analysis unit 301 recognizes partial regions with respect to the read page image according to document components.

For example, document components in the page image of FIG. 5A are a header 501, a header 502, a title 503, text 504, a region displaying a diagram 505, a region displaying a diagram 506, and the like. FIG. 5B is a view showing a result of automatic recognition of partial regions (objects) according to the document components with respect to the page image of FIG. 5A by the page structure analysis unit 301. The partial regions which are a result of the structural analysis processing are shown by rectangular dotted lines in FIG. 5B.

As shown in FIG. 5B, the header 501 is automatically recognized as a partial region 511. Similarly, the header 502 is recognized as a partial region 512, the title 503 is recognized as a partial region 513, the text 504 is recognized as a partial region 514, the region displaying a diagram 505 is recognized as a partial region 515, and the region displaying a diagram 506 is automatically recognized as a partial region 516. In addition, the background 500 (a region with the same range as the entire page image) is automatically recognized as a partial region 510.

In step S404, the page structure analysis unit 301 recognizes coordinates and widths and heights of the partial regions recognized in step S403. With respect to the coordinates and the widths and heights of the partial regions, description will be provided with an example of the partial region 513. The coordinates will be represented in a coordinate system with an origin at an upper left of the partial region 510 recognized as the background (a region with the same range as the entire page image). For example, coordinates of the partial region 513 are represented by a distance X13 from the origin to the upper left coordinates of the partial region 513 in an X axis direction and a distance Y13 from the origin to the upper left coordinates of the partial region 513 in a Y axis direction. Moreover, the width and height of the partial region are represented by a length W13 of the partial region 513 in the X axis direction and a length H13 in the Y axis direction.

In step S405, the page structure analysis unit 301 executes OCR processing and determines whether there is a character in the partial region. If there is a character, the procedure proceeds to step S406. If there is no character, the procedure proceeds to step S408.

In step S406, the page structure analysis unit 301 recognizes a character size from a result of the OCR processing.

In step S407, the page structure analysis unit 301 recognizes a text orientation (character orientation) from the result of the OCR processing. The text orientation refers to whether the text (character) is written horizontally or vertically.

In step S408, the page structure analysis unit 301 recognizes region attributes for each partial region. The region attributes are attributes corresponding to the document components such as a header, a footer, a title, text, a diagram, an image, and a background.

In step S409, the page structure analysis unit 301 recognizes a display order of individual partial regions. The display order is determined according to coordinates, widths and heights, or the like of the partial regions. In an example of FIG. 5B, a position in the display order of the partial region 510 is recognized as 1, a position in the display order of the partial region 511 is recognized as 2, and a position in the display order of the partial region 512 is recognized as 3. In addition, a position in the display order of the partial region 513 is recognized as 4, a position in the display order of the partial region 514 is recognized as 5, a position in the display order of the partial region 515 is recognized as 6, and a position in the display order of the partial region 516 is recognized as 7.

In step S410, the page structure analysis unit 301 stores information on the partial regions recognized in the previous step as partial region data. In fact, the page structure analysis unit 301 notifies to the partial region management unit 302 and stores the partial region data.

In step S411, the page structure analysis unit 301 performs an increment of the variable i to process a next page.

In step S412, the page structure analysis unit 301 determines whether the variable i exceeds the number of pages of the content 200 during processing. If the variable i does not exceed the number of pages, the procedure returns to step S402 to read a page image of a next page. If the variable i exceeds the number of pages, processing is completed for all pages of the content 200, and therefore the structural analysis processing of the page image is ended.

(Management of Partial Region Data)

FIG. 6 is a diagram showing a partial region management table.

The partial region management unit 302 manages the partial region data using the partial region management table. The partial region management unit 302 stores the partial region management table in the RAM 102, the HDD 104, or the like which is a storage device of the image display apparatus 100.

Figure 7:
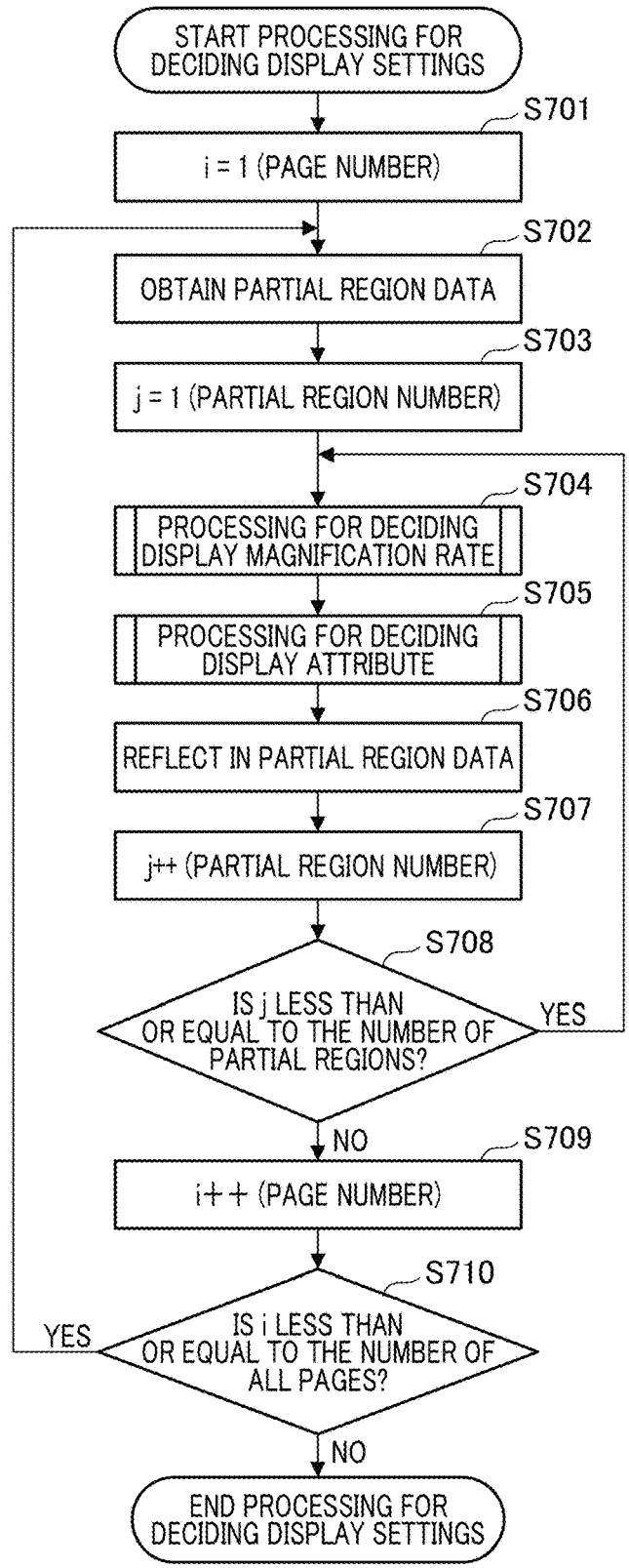
FIG. 7 is a flowchart describing processing for deciding display settings.

As shown in FIG. 6, items of the partial region data are arranged side by side in a row direction of the partial region management table. The items of the partial region data are configured of items obtained from a result of the structural analysis processing (FIG. 4) of the page image and items obtained from a result of processing for deciding display settings (FIG. 7).

First, a page number 601, a partial region number 602, coordinates 603, a width and height 604, region attributes 605, a text orientation 606, a character size 607, and a display order 608 which are items obtained from the result of the structural analysis processing (FIG. 4) of the page image will be described.

The page number 601 is a page number of a page image including partial regions. The partial region number 602 is a number for identifying a partial region. That is, a partial region can be uniquely identified using the page number 601 and the partial region number 602.

The coordinates 603 are upper left coordinates of the partial region. The width and height 604 are a width and a height of the partial region. The coordinates and the width and height of the partial region were described using FIG. 5C. The region attributes 605 are attributes corresponding to the document components such as a header, a footer, a title, text, a diagram, an image, and a background. The document components and the region attributes of the partial region were described using FIGS. 5A and 5B. The text orientation 606 and the character size 607 are a text orientation (vertical writing or horizontal writing) and a size of the character included in the partial region when the region attribute is text, a title, a header, or a footer. The display order 608 is a position in the display order of the partial regions in the page image for each page.

Next, a display magnification rate 611, a display time 612, display/non-display 613, and a display type 614 which are items obtained from the result of the processing for deciding display settings (FIG. 7) will be described.

The display magnification rate 611 is a display magnification rate at a time of display of an enlarged partial region. Processing for deciding a display magnification rate of a partial region will be described below using FIG. 8. The display time 612 is a display time for display of an enlarged partial region. A method of deciding the display time of a partial region will be described below using a flowchart of processing for deciding display attributes of FIG. 9.

The display/non-display 613 is a setting which shows whether to display a partial region. A method of deciding whether to display a partial region will be described below using a flowchart of processing for deciding display settings of FIG. 7. The display type 614 is a setting for switching partial regions to be displayed according to a result of human detection processing. In the embodiment, overview or detail is set as the display type. A partial region whose display type is set to overview is displayed if a person is not detected. A partial region whose display type is set to detail is displayed if a person is detected. Automatic reproduction processing of a partial region according to the display type 614 of the partial region data and a result of human detection processing will be described below using FIG. 10.

Next, data arranged side by side in a column direction of the partial region management table will be described.

In the partial region management table, all partial region data included in all page images 201 to 20N of the content 200 is managed and the partial region data is arranged side by side in the column direction. That is, data of one column corresponds to one piece partial region data. For example, the partial regions are seven from 510 to 516 in the page image shown in FIG. 5B, and the partial regions are managed in seven columns in the partial region table of FIG. 6. Values of each item of the partial region management table will be described in the processing for deciding display settings shown in FIGS. 7 to 9 (FIG. 7), the processing for deciding a display magnification rate (FIG. 8), and the processing for deciding display attributes (FIG. 9) shown in FIGS. 7 to 9.

(Processing for Deciding Display Settings)

Figure 8:
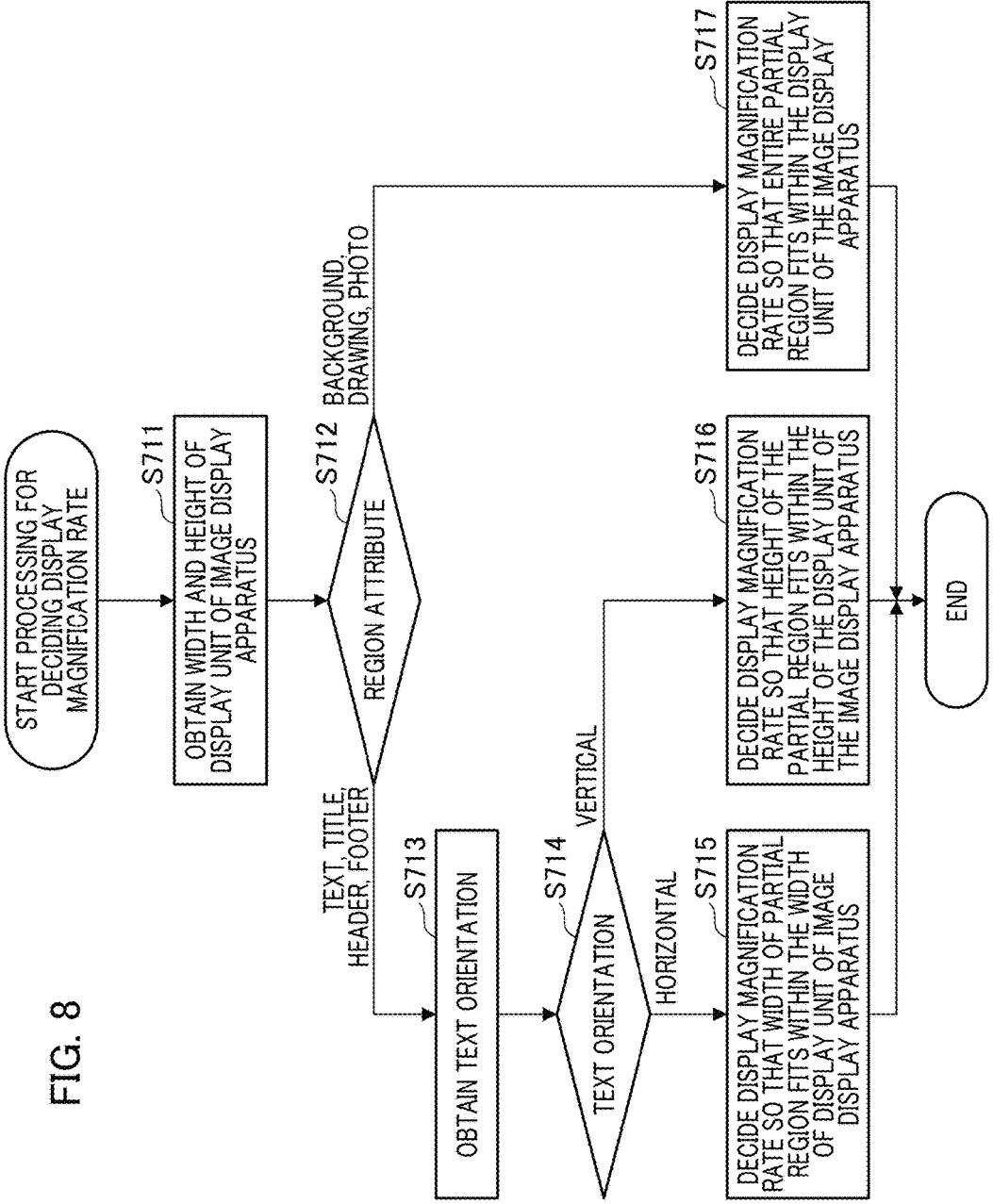
FIG. 8 is a flowchart describing processing for deciding a display magnification rate.
Figure 9:
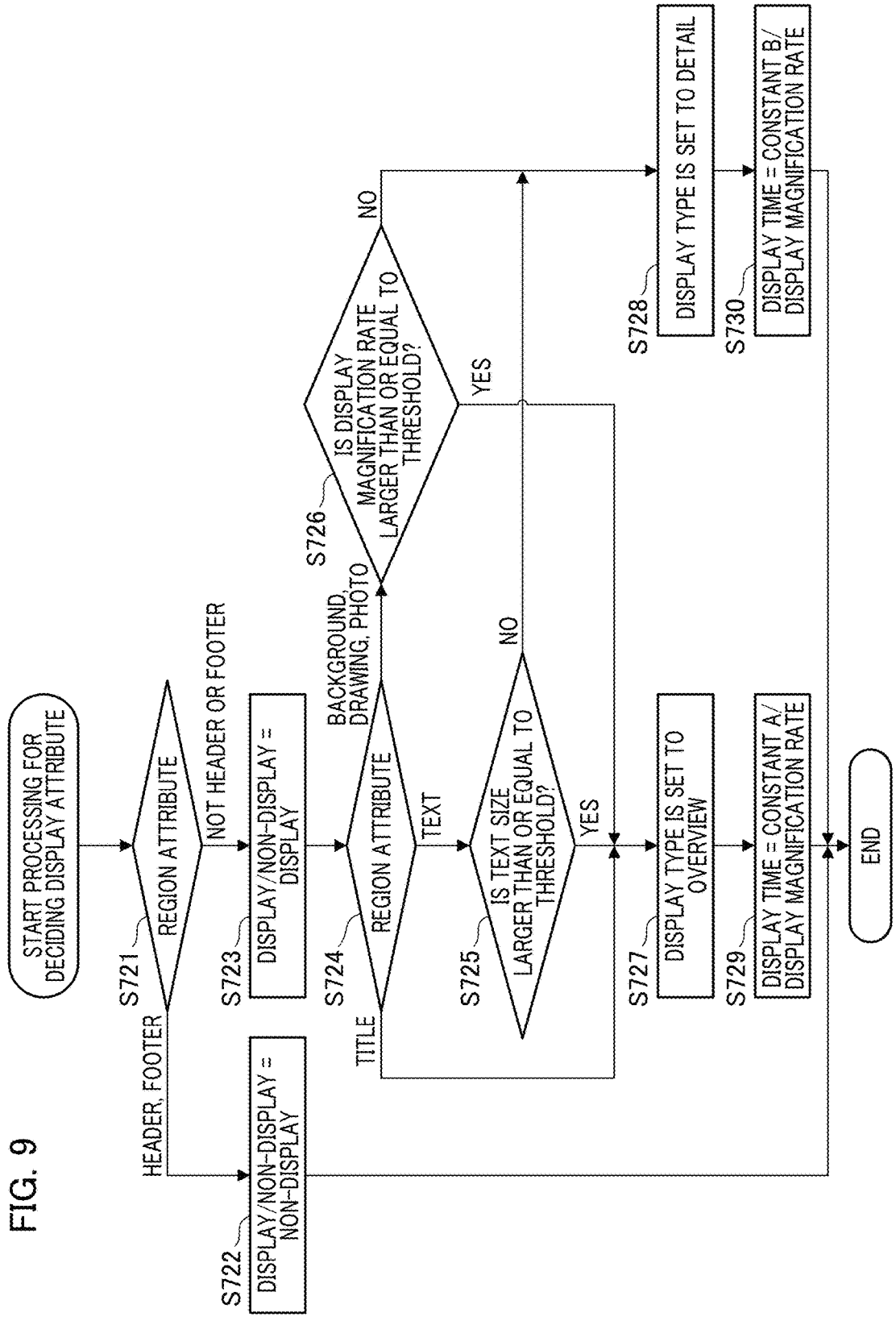
FIG. 9 is a flowchart describing processing for deciding display attributes.

FIGS. 7 to 9 are flowcharts describing processing for deciding display settings of each partial region, which is executed by the display settings decision unit 303.

As shown in FIG. 7, the processing for deciding display settings is configured of the processing for deciding a display magnification rate (S704) and the processing for deciding display attributes (S705). The processing for deciding display settings is executed in order with respect to all partial regions included in all page images of the content 200. That is, the processing is started from a first partial region included in a page image of a first page and is executed for every partial region of the first page. Then, after the processing for the first page is ended, the processing is executed for every partial region included in a page image of a next page. This procedure is repeated until a page image of a last page.

In step S701, the display setting decision unit 303 sets a page number to be processed to the variable i. The variable i is an index of an increment for executing processing for all pages. Initially, 1 of the first page number is set as the variable i.

In step S702, the display settings decision unit 303 obtains all partial region data of a page number set to the variable i in step S701 from the partial region management table.

In step S703, the display settings decision unit 303 sets a partial region number to be processed to a variable j. The variable j is an index of an increment for executing decision processing for all partial regions included in one page. Initially, 1 of the first partial region number is set as the variable j.

In step S704, the display settings decision unit 303 executes processing for deciding a display magnification rate. Here, the display magnification rate 611 is decided using the width and height 604 specified in the partial region data. Details of the processing for deciding a display magnification rate (S704) will be described below using the flowchart of FIG. 8.

In step S705, the display settings decision unit 303 executes the processing for deciding display attributes. Here, the display time 612, the display/non-display 613, and the display type 614 are decided using the display magnification rate 611 or the region attribute 605 specified in the partial region data. Details of the processing for deciding display attributes (S705) will be described below using the flowchart of FIG. 9.

In step S706, the display settings decision unit 303 reflects the display magnification rate 611, and display attributes such as the display time 612, the display/non-display 613, and the display type 614 of a partial region, which are decided in the previous step, in partial region data during the processing.

In step S707, the display settings decision unit 303 performs an increment of the variable j to process a next partial region.

In step S708, the display settings decision unit 303 determines whether the variable j exceeds the number of partial regions of a page during the processing. If the variable j does not exceed the number of partial regions, the procedure returns to step S704 to execute the processing for deciding a display magnification rate of a next partial region. If the variable j exceeds the number of partial regions, the procedure proceeds to step S709.

In step S709, the display settings decision unit 303 performs an increment of the variable i to process a next page.

In step S710, the display settings decision unit 303 determines whether the variable i exceeds the number of pages of the content 200 during the processing. If the variable i does not exceed the number of pages of the content 200, the procedure returns to step S702 to obtain all partial region data of a next page. If the variable i exceeds the number of pages of the content 200, the processing for deciding display settings is ended.

(Processing for Deciding Display Magnification Rate)

FIG. 8 is a flowchart describing processing for deciding a display magnification rate, which is executed by the display settings decision unit 303.

In this processing, the display settings decision unit 303 executes step S704 in the processing for deciding display settings shown in FIG. 7 described above and decides a display magnification rate for each partial region.

In step S711, the display settings decision unit 303 obtains a width and height of the display unit 105 of the image display apparatus 100. As shown in FIG. 1B, the width and height of the display unit 105 of the image display apparatus are (W00, H00).

In step S712, the display settings decision unit 303 determines the region attribute 605 specified in the partial region data. If the "region attribute" is text, a title, a header, or a footer, the procedure proceeds to step S713, and if the "region attribute" is a background, a diagram, or a photo, the procedure proceeds to step S717.

In step S713, the display settings decision unit 303 reads the text orientation 606 specified in the partial region data.

In step S714, the text orientation 606 read in step S713 is determined. If the text orientation is horizontal writing, the procedure proceeds to step S715, and if the text orientation is vertical writing, the procedure proceeds to step S716.

In step S715, the display settings decision unit 303 decides a display magnification rate of a partial region with the horizontal writing as the text orientation. Specifically, the display magnification rate of a partial region is decided so that a "width" specified in the partial region data fits within a width of the display unit 105 of the image display apparatus 100. For example, if the width specified in the partial region data is W10 and the width of the display unit 105 of the image display apparatus 100 is W00, the display magnification rate of the partial region is W00/W10 (a quotient obtained by dividing W00 by W10).

In step S716, the display settings decision unit 303 decides a display magnification rate of a partial region with the vertical writing as the text orientation. Specifically, a display magnification rate of the partial region is set so that a "height" specified in the partial region data fits within a height of the display unit 105 of the image display apparatus 100. For example, if the height specified in the partial region data is H10 and the height of the display unit 105 of the image display apparatus 100 is H00, the display magnification rate of the partial region is H00/H10 (a quotient obtained by dividing H00 by H10).

In step S717, the display settings decision unit 303 decides a display magnification rate of a partial region for which the region attribute 605 is a background, a diagram, or a photo. Specifically, a display magnification rate is decided so that a partial region having a width and height specified in the partial region data fits within the display unit 105 of the image display apparatus 100. That is, respective magnification rates of the width and the height are obtained and a smaller value is decided as the display magnification rate so that both the width and the height specified in the partial region data fit in the display unit 105.

For example, if the width and height specified in the partial region data are (W10, H10) and the width and height of the display unit 105 of the image display apparatus 100 are (W00, H00), the magnification rate W00/W10 of the width and the magnification rate H00/H10 of the height are compared with each other. Then, the smaller of the values is decided as the display magnification rate of the partial region. The display settings decision unit 303, as described above, decides a display magnification rate according to the region attribute or the text orientation, and then ends the processing for deciding a display magnification rate.

(Processing for Deciding Display Attributes)

FIG. 9 is a flowchart describing processing for deciding display attributes, which is executed by the display settings decision unit 303.

The display attributes include "display time," "display/non-display," and "display type" in the embodiment. In this processing, the display settings decision unit 303 executes step S705 in the processing for deciding display settings shown in FIG. 7 and decides display attributes for each partial region.

In step S721, the display settings decision unit 303 determines whether the region attribute 605 specified in the partial region data is one of a header and a footer. If the "region attribute" is a header or a footer, the procedure proceeds to step S722, and if the "region attribute" is not one of a header and a footer, the procedure proceeds to step S723.

In step S722, the display settings decision unit 303 sets a value of the display/non-display 613 of the partial region data to "non-display." Then, the display settings decision unit 303 ends the processing for deciding display attributes.

In step S723, the display settings decision unit 303 sets a value of the display/non-display 613 of the partial region data to "display."

In step S724, the display settings decision unit 303 determines the region attribute 605 specified in the partial region data. If the "region attribute" is a title, the procedure proceeds to step S727, and if the "region attribute" is text, the procedure proceeds to step S725. In addition, if the "region attribute" is a background, a diagram, or a photo, the procedure proceeds to step S726.

In step S725, the display settings decision unit 303 determines the character size 607 of text specified in the partial region data. If the character size 607 is a threshold or more, the procedure proceeds to step S727. If the character size is less than the threshold, the procedure proceeds to step S728.

In step S726, the display settings decision unit 303 determines the display magnification rate 611 of a partial region specified in the partial region data. If the display magnification rate 611 is a threshold or more, the procedure proceeds to step S727, and if the display magnification rate 611 is less than the threshold, the procedure proceeds to step S728.

In step S727, the display settings decision unit 303 sets a value of the display type 614 of the partial region data to "overview." A partial region for which the display type 614 is set to overview is a partial region displayed if a person is not detected.

In step S728, the display setting decision unit 303 sets a value of the display type 614 of the partial region data to "detail." A partial region for which the display type 614 is set to detail is a partial region displayed if a person is detected.

In step S729 and step S730, the display settings decision unit 303 decides the display time 612 of the partial region data. The display time 612 of a partial region is decided using the display magnification rate 611 specified in the partial region data. Specifically, the display time is decided by dividing a constant by the display magnification rate. Accordingly, a partial region having a larger display magnification rate has a shorter display time, and a partial region having a smaller display magnification rate has a longer display time.

Numerators of expressions used in step S729 and step S730 are set to a constant A and a constant B, respectively, and may be set to different values between step S729 and step S730. In this case, depending on whether the display type 614 of a partial region is overview or detail, it is possible to decide a display time in different manners. For example, if the display type 614 is detail, compared to the case of overview, it takes more time to understand display content, and thus it is possible to set a longer display time. The display settings decision unit 303 decides display attributes such as a display time, display/non-display, and a display type, and then ends the processing for deciding display attributes.

As an example of the processing for deciding display settings described using FIGS. 7 to 9, a case of using the page image of FIG. 5B and the partial region data of FIG. 6 is described. FIGS. 5B and 6 show the partial region data obtained by executing the structural analysis processing (FIG. 4) of a page image for the page image of FIG. 5A.

The partial region 510 of FIG. 5B is represented as data with a page number of 1 and a partial region number of 1 in the partial region data of FIG. 6. This partial region has the region attribute 605 of "background." Therefore, in step S717 of the processing for deciding a display magnification rate shown in FIG. 8, M10 is decided as a value of the display magnification rate 611. Moreover, in step S723 of the processing for deciding display attributes shown in FIG. 9, a value of the display/non-display 613 is set to "display." In addition, a value of the display type 614 in step S728 is decided to be "detail." Furthermore, T10 is decided as a value of the display time 612 in step S730.

The partial region 511 of FIG. 5B is represented as data with a page number of 1 and a partial region number of 2 in the partial region data of FIG. 6. This partial region has the region attribute 605 of "header." Therefore, in step S715 of the processing for deciding a display magnification rate shown in FIG. 8, M11 is decided as a value of the display magnification rate 611. In addition, in step S722 of the processing for deciding a display attribute shown in FIG. 9, a value of the display/non-display 613 is set to "non-display." Thus, the display type 614 and the display time 612 are not set.

The partial region 512 of FIG. 5B is represented as data with a page number of 1 and a partial region number of 3 in the partial region data of FIG. 6. This partial region has the region attribute 605 of "header." Therefore, in step S715 of the processing for deciding a display magnification rate shown in FIG. 8, M12 is decided as a value of the display magnification rate 611. In addition, in step S722 of the processing for deciding a display attribute shown in FIG. 9, a value of the display/non-display 613 is set to "non-display." Thus, the display type 614 and the display time 612 are not set.

The partial region 513 of FIG. 5B is represented as data with a page number of 1 and a partial region number of 4 in the partial region data of FIG. 6. This partial region has the region attribute 605 of "title." Therefore, in step S715 of the processing for deciding a display magnification rate shown in FIG. 8, M13 is decided as a value of the display magnification rate 611. In addition, in step S723 of the processing for deciding a display attribute shown in FIG. 9, a value of the display/non-display 613 is set to "display." Moreover, in step S727, a value of the display type 614 is decided to be "overview." Furthermore, in step S729, T13 is decided as a value of the display time 612.

The partial region 514 of FIG. 5B is represented as data with a page number of 1 and a partial region number of 5 in the partial region data of FIG. 6. This partial region has the region attribute 605 of "text." Therefore, in step S715 of the processing for deciding a display magnification rate shown in FIG. 8, M14 is decided as a value of the display magnification rate 611. In addition, in step S723 of the processing for deciding a display attribute shown in FIG. 9, a value of the display/non-display 613 is set to "display." Moreover, in step S725, the display magnification rate M14 is determined to be less than a threshold, and a value of the display type 614 is decided to be "detail" in step S727. Furthermore, T14 is decided as a value of the display time 612 in step S730.

The partial region 515 of FIG. 5B is represented as data with a page number of 1 and a partial region number of 6 in the partial region data of FIG. 6. This partial region has the region attribute 605 of "diagram." Therefore, in step S717 of the processing for deciding a display magnification rate shown in FIG. 8, M15 is decided as a value of the display magnification rate 611. In addition, in step S723 of the processing for deciding a display attribute shown in FIG. 9, a value of the display/non-display 613 is set to "display." Moreover, in step S726, the display magnification rate M15 is determined to be equal to or more than the threshold, and a value of the display type 614 is decided to be "overview" in step S727. Furthermore, T15 is decided as a value of the display time 612 in step S729.

The partial region 516 of FIG. 5B is represented as data with a page number of 1 and a partial region number of 7 in the partial region data of FIG. 6. This partial region has the region attribute 605 of "diagram." Therefore, in step S717 of the processing for deciding a display magnification rate shown in FIG. 8, M16 is decided as a value of the display magnification rate 611. In addition, in step S723 of the processing for deciding a display attribute shown in FIG. 9, a value of the display/non-display 613 is set to "display." Moreover, in step S726, the display magnification rate M16 is determined to be less than the threshold, and a value of the display type 614 is decided to be "detail" in step S728. Furthermore, T16 is decided as a value of the display time 612 in step S730.

(Automatic Reproduction Processing)

Figure 10:
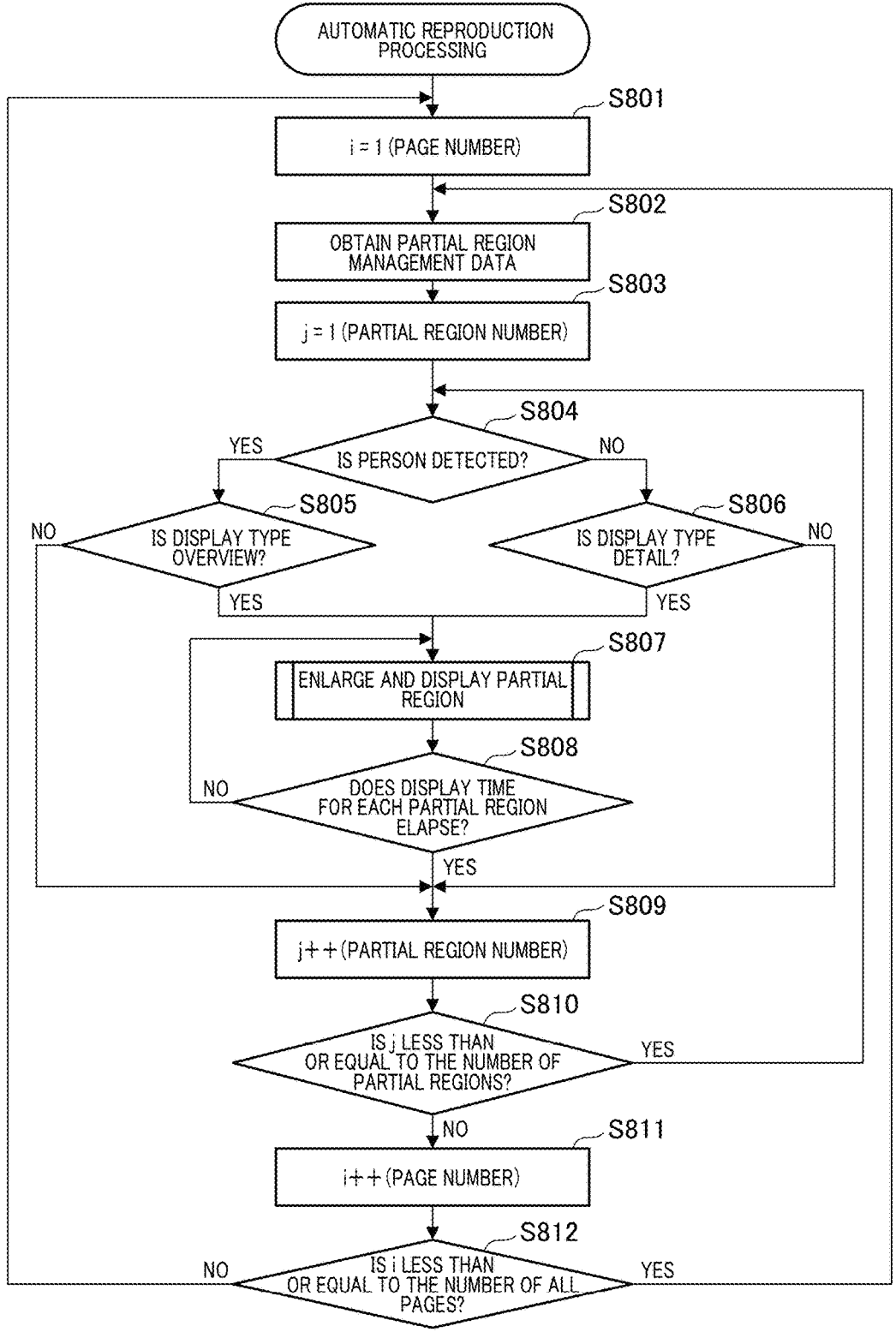
FIG. 10 is a flowchart describing automatic reproduction processing.

FIG. 10 is a flowchart describing automatic reproduction processing of a partial region, which is executed by the automatic reproduction unit 306.

The automatic reproduction processing is executed for all partial regions included in all page images of the content 200 in order. That is, the automatic reproduction unit 306 starts processing from a first partial region included in a page image of a first page and executes the processing for each partial region of the first page. Then, the automatic reproduction unit 306 executes the processing for each partial region included in a page image of a next page after the processing for the first page is ended. Display control is performed so that this procedure is repeated until a page image of a last page.

In step S801, the automatic reproduction unit 306 sets a page number to be processed to a variable i. The variable i is an index of an increment for executing the processing for all pages. Initially, 1 of the first page number is set as the variable i.

In step S802, the automatic reproduction unit 306 obtains management data of all partial regions of the page number set as the variable i in step S801 from a partial region management table.

In step S803, the automatic reproduction unit 306 sets a partial region number to be processed as a variable j. The variable j is an index of an increment for executing automatic reproduction processing for all partial region included in one page. Initially, 1 of the first partial region number is set as the variable j.

In step S804, the automatic reproduction unit 306 determines a result of human detection processing (human detection information) notified of by the human detection unit 305. The human detection processing will be described below using FIG. 11. If the human detection information is "Yes," that is, if there is a person in a detection range 110 during a predetermined time, the procedure proceeds to step S805. If the human detection information is "No," that is, if there is no person in the detection range 110 during the predetermined time, the procedure proceeds to step S806.

In step S805, the automatic reproduction unit 306 determines the display type 614 of a partial region specified in the partial region data. If a value of the display type 614 is "overview," the procedure proceeds to step S807. If a value of the display type 614 is not "overview," the procedure proceeds to step S809.

In step S806, the automatic reproduction unit 306 determines the display type 614 of a partial region specified in the partial region data. If a value of the display type 614 is "detail," the procedure proceeds to step S807. If a value of the display type 614 is not "detail," the procedure proceeds to step S809.

In step S807, the automatic reproduction unit 306 executes magnification display processing of a partial region. The magnification display processing of a partial region is processing for displaying a partial region on the display unit 105 at an appropriate display magnification rate according to a value specified in the partial region data. The magnification display processing of a partial region will be described below using a flowchart of FIG. 12.

In step S808, the automatic reproduction unit 306 checks an elapsed display time of a partial region. Specifically, the automatic reproduction unit 306 checks whether time for which a partial region has been displayed passes a value of the display time 612 specified in the partial region data. If the time for which the partial region has been displayed passes the display time, the procedure proceeds to step S809. if the time does not pass the display time, the magnification display processing of a partial region in step S807 is continued.

In step S809, the automatic reproduction unit 306 performs an increment of the variable j to process a next partial region.

In step S810, the automatic reproduction unit 306 determines whether the variable j exceeds a partial region number of a page during processing. If the variable j does not exceed the partial region number, the procedure returns to step S804 to execute the human detection processing. If the variable j exceeds the partial region number, the processing for all partial regions included in a page image during the processing is assumed to be completed, and thus the procedure proceeds to step S811.

In step S811, the automatic reproduction unit 306 performs an increment of the variable i to process a next page.

In step S812, the automatic reproduction unit 306 determines whether the variable i exceeds the number of pages of the content 200 during processing. If the variable i does not exceed the number of pages of the content 200, the procedure returns to step S802 to obtain all partial region data of a next page. If the variable i exceeds the number of pages of the content 200, the procedure returns to step S801 to repeat the processing from a first page and to continue the automatic reproduction processing. The automatic reproduction unit 306 repeatedly executes the automatic reproduction processing in this manner. A screen transition of the display unit 105 of the image display apparatus 100 when the automatic reproduction processing is executed will be described below using FIGS. 13A to 13E.

(Human Detection Processing)

Figure 11:
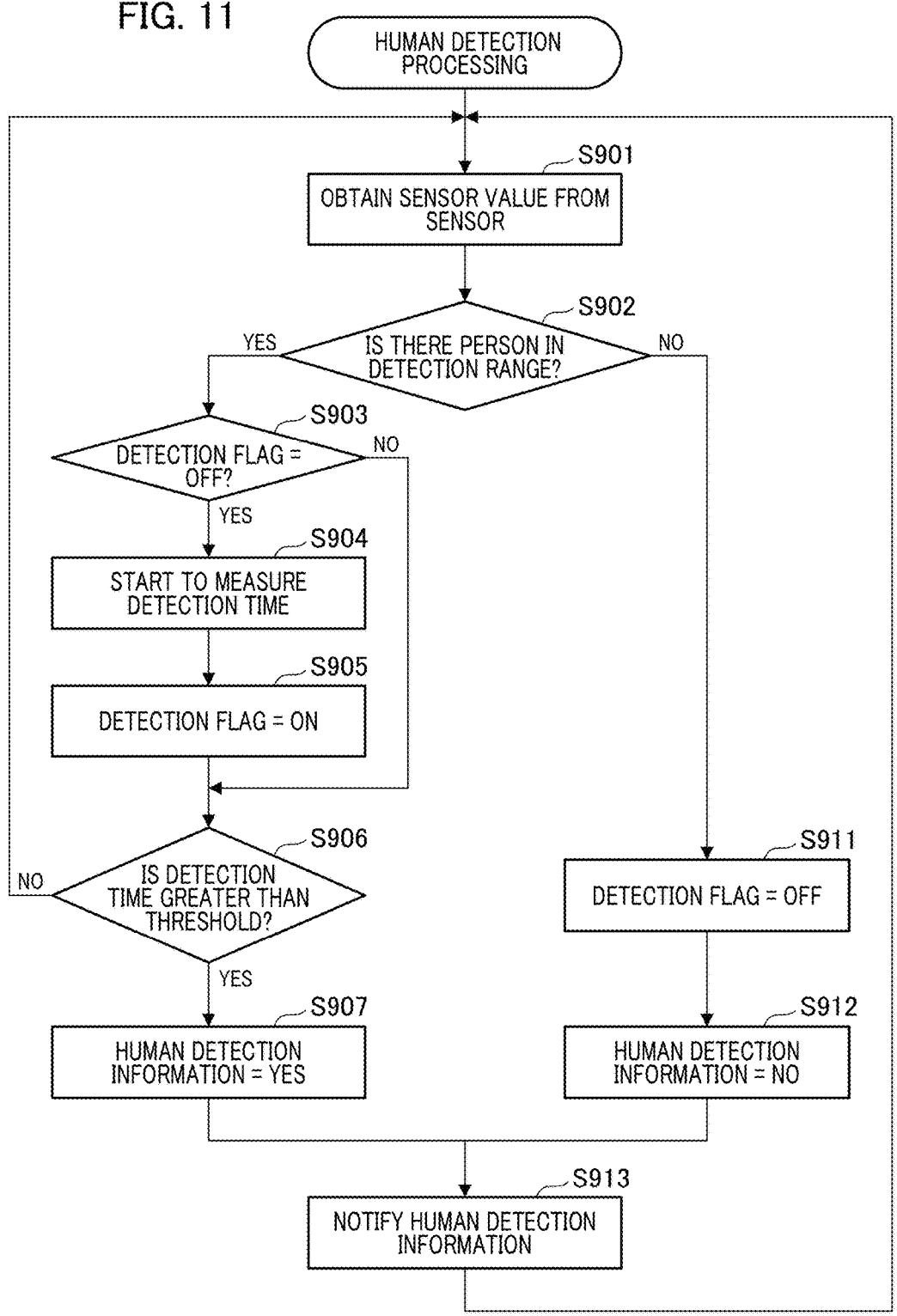
FIG. 11 is a flowchart describing human detection processing.

FIG. 11 is a flowchart for describing human detection processing executed by the human detection unit 305.

The human detection processing is processing in which the sensor 106 detects whether there is a person in a detection range for a certain period of time. A result of this processing is used in step S804 of the automatic reproduction processing shown in FIG. 10.

In step S901, the human detection unit 305 obtains a sensor value from the sensor 106.

In step S902, the human detection unit 305 determines whether there is a person in the detection range 110 using the sensor value obtained in step S901. If there is a person in the detection range 110, the procedure proceeds to step S903. If there is no person in the detection range 110, the procedure proceeds to step S911.

In step S903, the human detection unit 305 determines a detection flag. If the detection flag is set to OFF, the procedure proceeds to step S904. If the detection flag is set to ON, the procedure proceeds to step S906. The detection flag is a flag which represents whether time for which a person is present in the detection range 110 is being measured.

In step S904, the human detection unit 305 starts measurement of the detection time. The detection time is time for which a person is present in the detection range 110.

In step S905, the human detection unit 305 sets the detection flag to ON.

In step S906, the human detection unit 305 determines whether the detection time exceeds a threshold. If the detection time exceeds the threshold, the procedure proceeds to step S907. If the detection time does not exceed the threshold, the procedure returns to step S901 to continue obtaining a sensor value from the sensor 106.

In step S907, the human detection unit 305 sets the human detection information to "Yes." Then, the procedure proceeds to step S913.

In step S911, the human detection unit 305 sets the detection flag to OFF.

In step S912, the human detection unit 305 sets the human detection information to "No." Then, the procedure proceeds to step S913.

In step S913, the human detection unit 305 notifies the automatic reproduction unit 306 of the human detection information. The human detection unit 305 notifies the automatic reproduction unit 306 of the human detection information, and then continues obtaining a sensor value from the sensor 106.

(Magnification Display Processing of a Partial Region)

Figure 12:
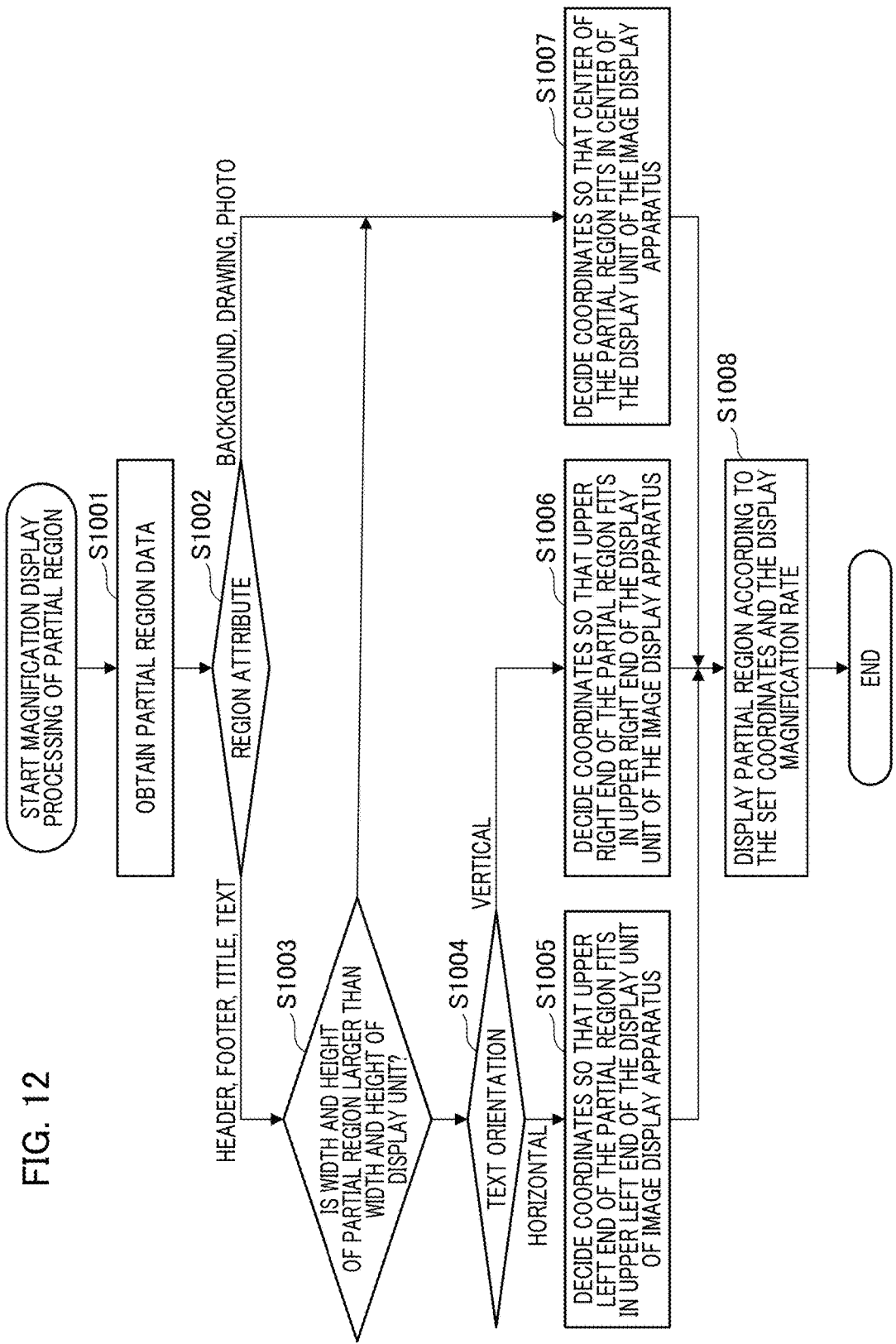
FIG. 12 is a flowchart describing magnification display processing of a partial region.
Figure 13A:
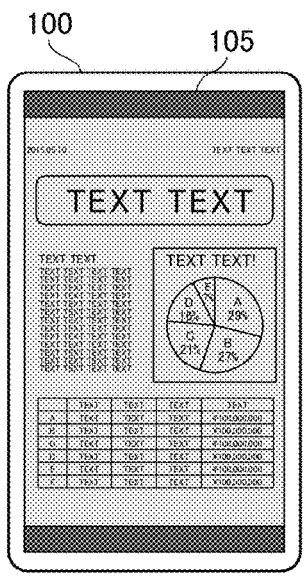
FIGS. 13A to 13E are diagrams showing screen transition at the time of automatic reproduction processing.
Figure 13B:
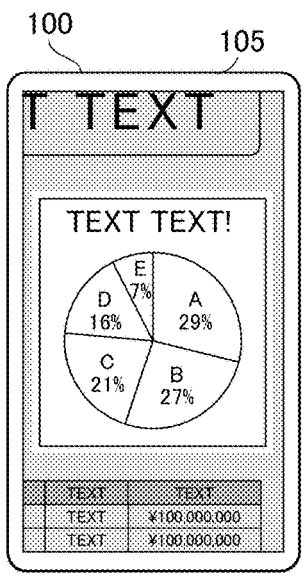
Figure 13C:
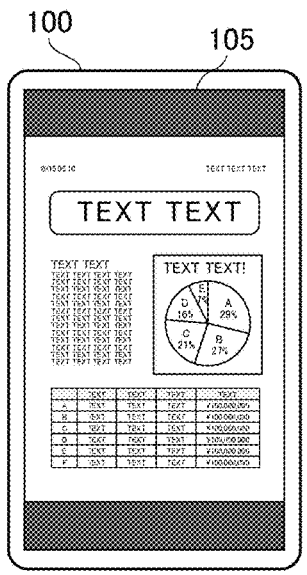
Figure 13D:
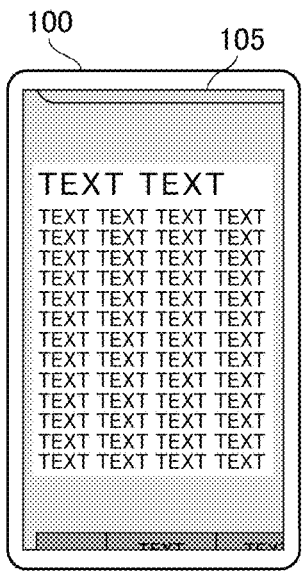
Figure 13E:
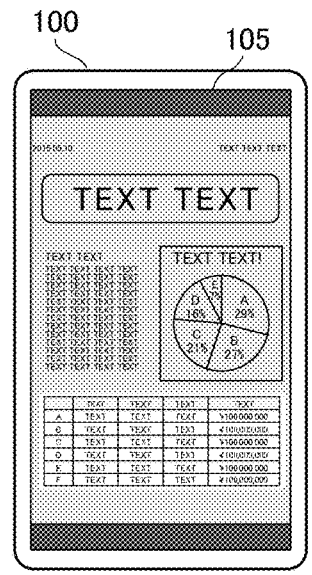

FIG. 12 describes magnification display processing of a partial region which is executed by the magnification display unit 304.

This processing is executed in step S807 in the automatic reproduction processing shown in FIG. 10, and includes enlarging and displaying each partial region at an appropriate display magnification rate.

In step S1001, the magnification display unit 304 obtains partial region data during the automatic reproduction processing from the partial region management table.

In step S1002, the magnification display unit 304 determines the region attribute 605 specified in the partial region data. If the region attribute 605 is text, a title, a header, or a footer, the procedure proceeds to step S1003, and if the region attribute 605 is a background, a diagram, or a photo, the procedure proceeds to step S1007.

In step S1003, the magnification display unit 304 determines whether an entire partial region fits within the width and height of the display unit 105 of the image display apparatus 100 if a partial region during the processing is enlarged or reduced at the display magnification rate 611 specified in the partial region data. If the enlarged or reduced partial region is larger than the width and height of the display unit 105 of the image display apparatus 100 and the entire partial region cannot be displayed, the procedure proceeds to step S1004. If the enlarged or reduced partial region is smaller than or equal to the width and height of the display unit 105 of the image display apparatus 100 and the entire partial region can be displayed, the procedure proceeds to step S1007.

In step S1004, since the enlarged or reduced partial region is larger than the display unit 105 of the image display apparatus 100 and the entire partial region cannot be displayed, the magnification display unit 304 decides a display region of the partial region according to a text orientation. The magnification display unit 304 determines a text orientation using the text orientation 606 specified in the partial region data. If the text orientation is horizontal, the procedure proceeds to step S1005, and if the text orientation is vertical, the procedure proceeds to step S1006.

In step S1005, the magnification display unit 304 sets a display position so that a first row of a partial region with the horizontal writing as the text orientation is displayed on the display unit 105. Specifically, the magnification display unit 304 decides coordinates of the partial region so that an upper left end of the partial region fits in an upper left end of the display unit 105 of the image display apparatus.

In step S1006, the magnification display unit 304 sets a display position so that a first row of a partial region with the vertical writing as the text orientation is displayed on the display unit 105. Specifically, the magnification display unit 304 decides coordinates of the partial region so that an upper right end of the partial region fits within an upper right end of the display unit 105 of the image display apparatus.

In step S1007, the magnification display unit 304 decides coordinates of a partial region so that a center of the partial region fits within a center of the display unit 105.

In step S1008, the magnification display unit 304 displays a partial region on the display unit 105 according to the coordinates set until a previous step and the display magnification rate specified in the partial region data. Then, the magnification display unit 304 ends the magnification display processing of the partial region.

(Screen Transition Example of the Automatic Reproduction Processing)

FIGS. 13A to 13E are diagrams showing screen transition on the display unit 105 of the image display apparatus when the automatic reproduction processing shown in FIG. 10 is executed.

Here, as an example, a case in which the structural analysis processing (FIG. 4) of a page image and the processing for deciding display settings (FIGS. 7 to 9) are executed for the page image 201 of a first page of the content 200, and the obtained partial region data (FIG. 6) is used will be described.

In the automatic reproduction processing (FIG. 10), the automatic reproduction unit 306 obtains all partial region data of image data of a first page in step S801 and step S802. The automatic reproduction unit 306 receives a notification (human detection information) of whether there is a person in the detection range 110 of the image display apparatus 100 from the human detection unit 305 in step S804.

The automatic reproduction unit 306 enlarges and displays partial regions with partial region numbers of 4 and 6 in order by processing of steps S806 to S810 at each display time if there is no person in the detection range 110. At this time, the partial regions are displayed on the display unit 105 in the order of FIG. 13A and FIG. 13B.

On the other hand, the automatic reproduction unit 306 enlarges and displays partial regions with partial region numbers of 1, 5, and 7 in order by processing of steps S805 to S810 at each display time if there is a person in the detection range 110. At this time, partial regions are displayed on the display unit 105 in the order of FIG. 13C, FIG. 13D, and FIG. 13E.

As described above, in the embodiment, content displayed on an image display apparatus can be automatically selected and switched to be displayed according to whether there is a person near the image display apparatus. Accordingly, even if content created for printing on paper is displayed in digital signage, it is possible to automatically select and display optimum display content according to whether there is a person near the image display apparatus.

For example, if there is no person near the image display apparatus, it is possible to automatically select only a portion displaying an overview of content, and to enlarge and display the portion at an optimum magnification rate so that the display content can be understood from a distance. In addition, if a person comes close to an image display apparatus and the like, it is possible to automatically select a portion displaying details of the content and perform an optimum enlargement display thereon so that more detailed content within the content can be understood. In this manner, it is possible to encourage someone to approach digital signage by performing an enlargement display on only an overview which makes display content easy to understand even from a distance of an image display apparatus. In addition, after the person approaches, it is possible to perform display that is simple enough that the user is not burdened by switching the overview into detailed display and performing enlargement display thereon.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-157983, filed Aug. 10, 2015, which is hereby incorporated by reference wherein in its entirety.

What is claimed is:

1. An image display apparatus comprising:
a display control unit configured to enlarge a display target object to be displayed among a plurality of objects included in an image and to display the enlarged display target object on a screen one by one in a predetermined order;
a detection unit configured to detect whether there is a person in a predetermined range from the image display apparatus; and
a switching unit configured to switch a next display target object to be enlarged and displayed on the screen by the display control unit,
wherein, in a case that a person is detected in the predetermined range from the image display apparatus by the detection unit, the switching unit switches to an object that is classified as a first display type on the screen as the display target object among the plurality of objects by the display control unit, and, in a case that a person is not detected in the predetermined range from the image display apparatus by the detection unit, the switching unit switches to an object that is classified as a second display type which is different from the first display type on the screen as the display target object among the plurality of objects by the display control unit.

2. The image display apparatus according to claim 1,
wherein the display control unit adds an attribute for display to each of the plurality of objects included in the image, and
wherein the switching unit switches the display target object to be displayed on the screen using the attribute added to each of the plurality of objects based on a result detected by the detection unit.

3. The image display apparatus according to claim 2, wherein the attribute includes at least any one of display propriety indicating whether or not to display the object on the screen, a display magnification rate at a time of displaying the object on the screen, a display type indicating whether the object is classified as the second display type that indicates an overview of the image or the object is classified as the first display type that indicates a detailed content of the image, and a display time for which the object is to be displayed on the screen.

4. The image display apparatus according to claim 2,
wherein, if the detection unit detects that there is a person in a predetermined range from the image display apparatus, the switching unit switches the object with the added attribute which the first display type indicates detailed content of the image on the screen as the display target object among the plurality of objects by the display control unit, and
wherein, if the detection unit does not detect there is a person in the predetermined range from the image display apparatus, the switching unit switches the object with the added attribute which the second display type indicates an overview of the image on the screen as the display target object among the plurality of objects by the display control unit.

5. The image display apparatus according to claim 4,
wherein, if the object has a character of a size larger than or equal to a predetermined size, the attribute added to the object is the second display type indicating that the object indicates an overview of the image, and
wherein, if the object has a character of a size less than the predetermined size, the attribute added to the object is the first display type indicating that the object indicates detailed content of the image.

6. The image display apparatus according to claim 4,
wherein, if a magnification rate of the object is equal to or larger than a predetermined value, the attribute added to the object is the second display type indicating that the object indicates an overview of the image, and
wherein, if the magnification rate of the object is less than the predetermined value, the attribute added to the object is the first display type indicating that the object indicates detailed content of the image.

7. The image display apparatus according to claim 6, wherein a display time for which the display target object is displayed on the screen is controlled so that a magnification rate of the display target object is inversely proportional to the display time.

8. The image display apparatus according to claim 2, wherein, when the display control unit displays the display target object on the screen, a display time in a case in which the attribute added to the display target object is the second display type indicating an overview of the image is shorter than a display time in a case in which the attribute added to the display target object is the first display type indicating detailed content of the image.

9. The image display apparatus according to claim 2, wherein, if the object is a header or a footer, the attribute added to the object is an attribute which indicates not to display the object on the screen by the display control unit regardless of a result of detection by the detection unit.

10. The image display apparatus according to claim 1, wherein the detection unit determines that there is a person near the image display apparatus if there is a person in a predetermined detection range for longer than a certain period of time.

11. A method for controlling an image display apparatus comprising:
enlarging a display target object to be displayed among a plurality of objects included in an image and displaying the enlarged display target object on a screen one by one in a predetermined order;
detecting whether there is a person in a predetermined range from the image display apparatus; and
switching a next display target object to be enlarged and displayed on the screen in the displaying,
wherein, in a case that a person is detected in the predetermined range from the image display apparatus in the detecting, it is switched to an object that is classified as a first display type on the screen as the display target object among the plurality of objects in the displaying, and, in a case that a person is not detected in the predetermined range from the image display apparatus in the detecting, it is switched to an object that is classified as a second display type which is different from the first display type on the screen as the display target object among the plurality of objects in the displaying.

12. A non-transitory storage medium on which is stored a computer program for making a computer function as respective units of an image display apparatus, the image display apparatus comprising:
a display control unit configured to enlarge a display target object to be displayed among a plurality of objects included in an image and to display the enlarged display target object on a screen one by one in a predetermined order;

a detection unit configured to detect whether there is a person in a predetermined range from the image display apparatus; and a switching unit configured to switch a next display target object to be enlarged and displayed on the screen by the display control unit, wherein, in a case that a person is detected in the predetermined range from the image display apparatus by the detection unit, the switching unit switches to an object that is classified as a first display type on the screen as the display target object among the plurality of objects by the display control unit, and, in a case that a person is not detected in the predetermined range from the image display apparatus by the detection unit, the switching unit switches to an object that is classified as a second display type which is different from the first display type on the screen as the display target object among the plurality of objects by the display control unit.

* * * * *